Oct. 7, 1947.  V. W. WEST  2,428,729
LIQUID DISPENSING APPARATUS
Filed May 27, 1942  3 Sheets-Sheet 1
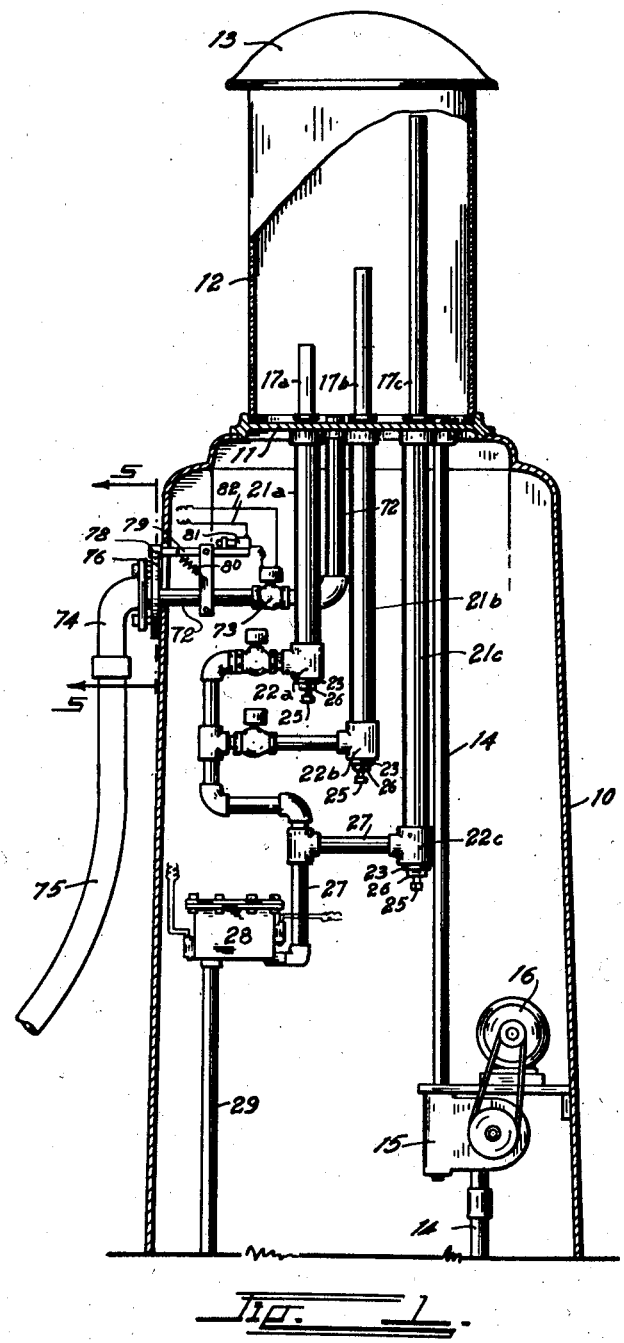
INVENTOR.
VERN W. WEST.
BY WHITEHEAD AND VOGL.
PER Earle Whitehead
ATTORNEYS.

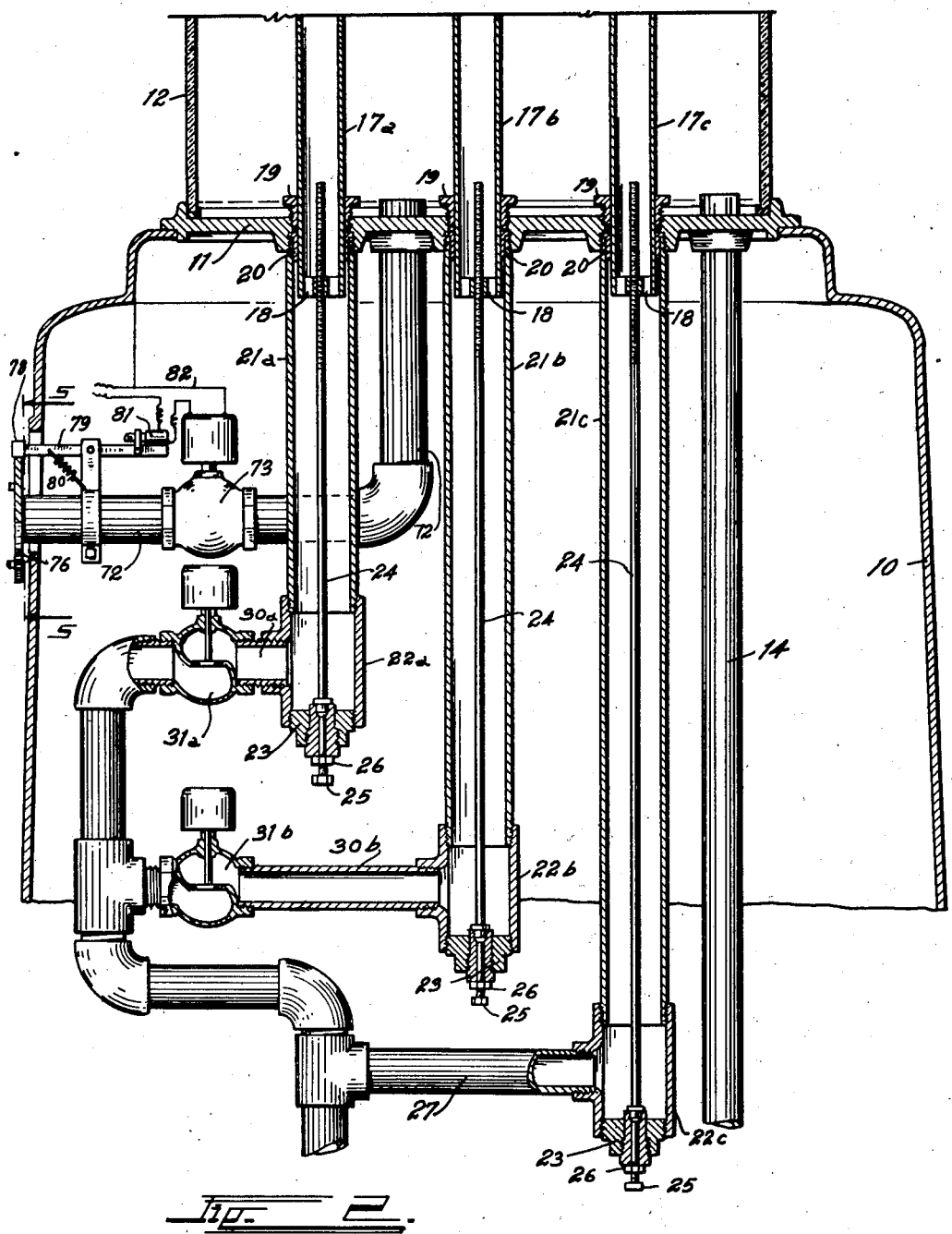

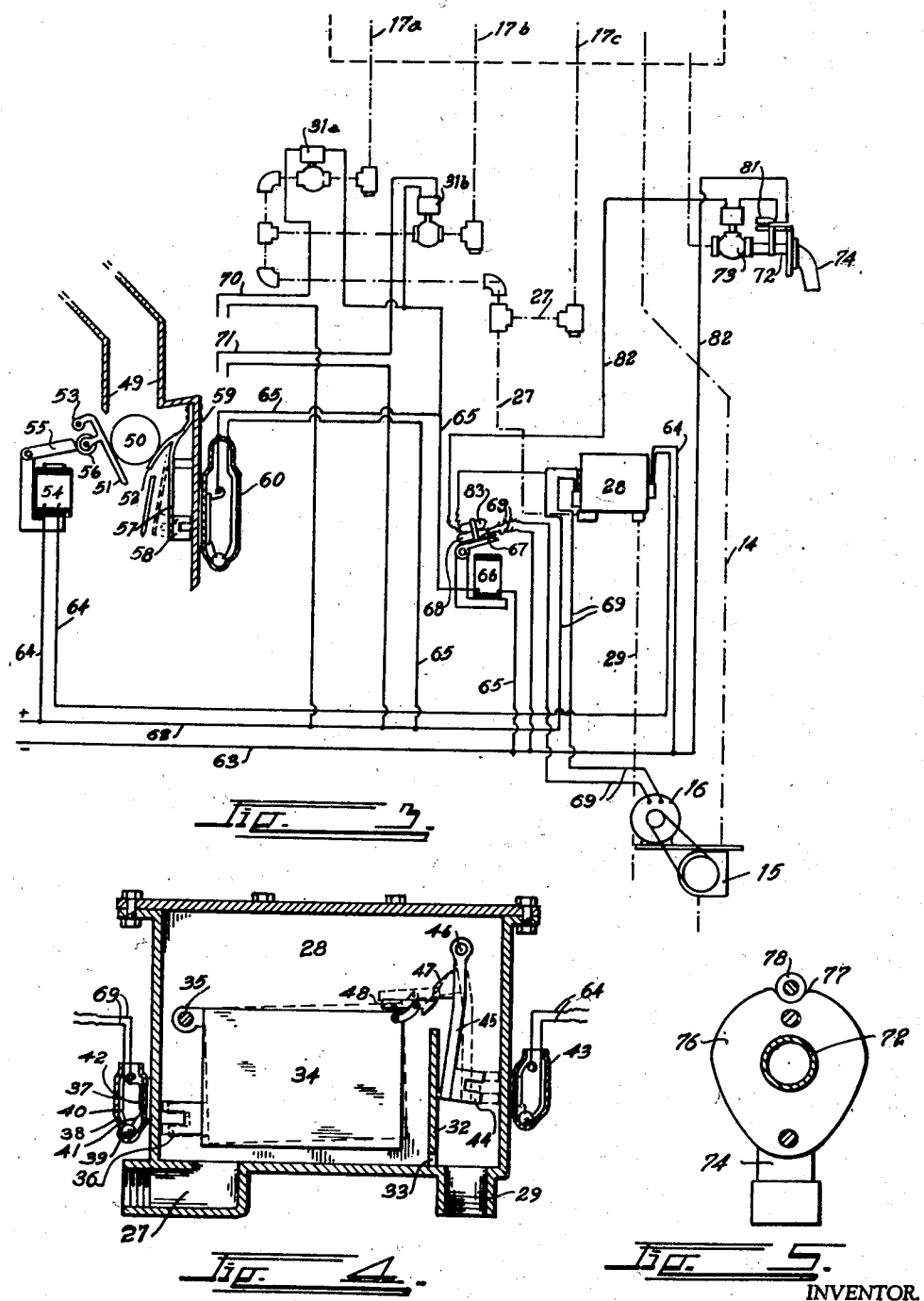

Patented Oct. 7, 1947

2,428,729

UNITED STATES PATENT OFFICE 2,428,729

LIQUID DISPENSING APPARATUS

Vern W. West, Denver, Colo., assignor, by direct and mesne assignments, to Automatic Devices, Inc., a corporation of Colorado Application May 27, 1942, Serial No. 444,647

6 Claims. (Cl. 194—13)

This invention relates to means and apparatus for the vending and dispensing of liquids, such as gasoline, and the like, and especially to apparatus of said class operable to automatically deliver a measured quantity of liquid proportioned to the value of a given standard coin employed to actuate the apparatus.

Objects of the invention are (a) to provide improved apparatus automatically operable through the sole actuation of a standard coin to measure and position for manually-controlled delivery a quantity of liquid proportioned to the value of the coin; (b) to provide improved means adjustably operable to automatically measure a quantity of liquid in dispensing apparatus; (c) to provide improved means for altitudinally adjusting the intake ends of volume-determining overflow standards in the delivery bowl or chamber of liquid-dispensing apparatus; (d) to provide improved overflow-actuated control means in operative association with coin-controlled liquid dispensing apparatus; (e) to provide improved overflow-actuated means automatically operable to interrupt flow of liquid to a delivery chamber and to simultaneously condition control elements for selective discharge of liquid from said chamber; (f) to provide improved, manually-controlled means for the selective discharge of an automatically-measured quantity of liquid from the delivery bowl or chamber of liquid-dispensing apparatus; (g) to provide improved apparatus of the character described that is simple and inexpensive of construction and installation, fully automatic in operation to the point of ultimate discharge of measured liquid, which is susceptible of simple and convenient adjustment to proportion the quantity of delivered liquid to the value of a given coin, which presents a minimum of fire or explosive hazard, and which requires a minimum of maintenance for efficient operation through long periods of use.

With these and other objects in view, all of which will more fully hereinafter appear, my invention comprises certain novel constructions, combinations and arrangements of parts, as will be hereinafter fully described and claimed, and as illustrated in the accompanying drawings, in which—

Figure 1 is an elevation, partly in section, of a somewhat conventionalized embodiment of the invention as arranged for practical use.

Figure 2 is a fragmentary, detail section, on an enlarged scale, taken vertically through measuring and dispensing elements and accessory devices of the improved apparatus.

Figure 3 is a diagrammatic representation of the control circuits and devices employed for automatic, coin-actuated operation of the improved apparatus.

Figure 4 is a section, on an enlarged scale, taken vertically through an improved float chamber and associated control means advantageously employed in the automatic operation of the improved apparatus.

Figure 5 is a fragmentary, detail section, on an enlarged scale, taken on the indicated line 5—5 of Figure 2.

In the construction of the improvement as shown, a typical station for the measuring and dispensing of liquid, such as gasoline, is shown as comprising a typical, hollow pedestal or base 10 adapted to be suitably fixed in upstanding relation with the ground or other supporting surface to carry and house the elements of the measuring and dispensing apparatus. The upper end of the base 10 supports and is closed by a cap 11 which cooperates with the lower, open, end of a cylindrical bowl 12 to form a measuring chamber surmounting the base 10, having a suitable cap 13 closing and protecting the upper end of the bowl 12. A supply line 14 leads from an underground storage tank, or other supply, of liquid to be dispensed, through a pump 15, to and is suitably sealed through the cap 11 to discharge within the bowl 12, an electric motor 16 being associated in driving relation with the pump 15 so that operation of said motor acts through said pump to deliver liquid through line 14 to the interior of the bowl 12.

The quantity of liquid delivered to and retained within the bowl 12 is measured and proportioned to the value of a given coin by means of adjustable overflow standards uprising from the cap 11 within said bowl in a number corresponding to the number of coins of different values which the apparatus is adapted to receive. Thus, when the apparatus is arranged for actuation by coins of twenty-five cent, fifty cent, and one dollar values, three overflow standards will be provided within the bowl 12, one such standard for each coin value. The embodiment of the invention shown in the drawings is arranged for selective actuation by three coins of different values, and hence is illustrated as including three separate overflow standards, one for each coin value, identical in construction and adjustable mounting, differing only in length and consequent altitudinal extension within the bowl 12, and respectively designated 17a, 17b, and 17c.

Each of the overflow standards is in the form of a straight, tubular member open at its upper end and provided with a spider 18, formed with a central boss having an internally-threaded bore disposed axially of its member, at its lower end. Each overflow standard slidably engages through a packing gland 19 and guide sleeve 20 carried by the cap 11 to seal said standard through, and in adjustable, perpendicular relation with, said cap, and the lower end of each of said standards freely telescopes within the upper portion of a relatively larger tubular member 21a, 21b, or 21c, which is fixed at its upper end to and depends from the cap 11 in axial alignment with its associated standard.

The lower ends of the members 21a, 21b, and 21c support and communicate with fittings 22a, 22b, and 22c, each of which fittings is closed at its lower end by means of a plug 23 wherethrough one end of a threaded stem 24 is rotatably sealed to position said stem axially of and within the corresponding tubular member 21a, 21b, or 21c, with the threaded portion of said stem operatively engaging the internally-threaded bore of the spider 18 carried by the associated standard 17a, 17b, or 17c. Each stem 24 projects at its lower end beyond its plug 23 and terminates in a tool-engageable head 25 whereby said stem may be rotated, and each said stem is held against displacement axially of its plug 23 and is preferably provided with means, such as a lock nut 26, whereby said stem may be clamped to and held against rotation within the plug 23. As will be apparent, the lock nuts 26 may be loosened and the stems 24 rotated through application of a tool to their heads 25, such rotation serving to shift the associated overflow standards axially in a direction dependant upon the direction of stem rotation, and thereby vary the altitudinal extension of said standards within the bowl 12 to adjust the quantity of liquid retained in the bowl 12 as determined by the position of the overflow or intake end of each such standard.

The fitting 22c associated with the overflow standard 17c, which is the standard determining the maximum quantity of liquid dispensible through the apparatus, communicates through a side discharge with an outflow line 27 which leads through a float chamber 28 and a return line 29 to the stored supply of liquid, so that overflow through the standard 17c is returned to the liquid supply, leaving in the bowl 12 only that amount of liquid measured by the altitudinal extension of said standard 17c within said bowl. The fittings 22a and 22b have side discharges communicating through outflow lines 30a and 30b, respectively, with and through normally-closed, electrically-controlled valves 31a and 31b and thence with the outflow line 27, so that flow received by said fittings may, upon opening of the corresponding valve 31a or 31b, be returned through the line 27, float chamber 28 and return line 29 to the original supply of liquid.

The float chamber 28 is in the form of a hollow box of non-magnetic material completely closed against escape of fluid except for its communication with the overflow line 27 and return line 29, and a baffle 32 transversely divides the interior of said chamber into greater and lesser compartments wherewith the lines 27 and 29 respectively communicate, said baffle being apertured, as at 33, adjacent its lower margin, to provide a restricted flow passage having an effective area less than that of the overflow line 27.

A float 34 is operatively disposed in the greater compartment of the chamber 28 and is pivoted adjacent its upper corner remote from the baffle 32 for actuation through a vertical arc about a fixed pin 35, the baffle 32 serving through engagement with the lower adjacent margin of the float 34 to limit upward travel of the latter. A permanent magnet 36 is fixed to the float 34 adjacent the float lower margin and on the side of the float remote from the baffle 32, and said magnet 36 is so proportioned and positioned as to engage with its prongs against the adjacent side of the chamber 28 and determine the lowermost position of the float in the absence of liquid in the chamber 28.

A magnetically-responsive switch member 37 is suitably supported and protected exteriorly of the chamber 28 and immediately opposite the prongs of the magnet 36, said member 37 being of a type and construction which reacts to close a circuit in response to the influence of the magnet 36 when the latter is in contact with the chamber wall, and to automatically open said circuit when the magnet 36 is swung with the float 34 away from its engaging relation with said wall. The switch member 37 may be of any specific construction suitable to its function, and is conventionally illustrated as comprising a vertically-disposed, elongate housing 38 of non-conductive material, a ball or drop of mercury 39 in the lower end of said housing, a fixed conductor finger 40 leading from contact with the mercury 39 to connect with a conductor exteriorly of the housing 38, a spring-mounted conductor finger 41 arranged for make-and-break contact with the mercury and for connection with a conductor exteriorly of the housing 38, and a magnetically-susceptible block 42 on the finger 41, interiorly of the housing 38, said block 42 being so disposed and the member 37 so mounted as to cause said block to shift and bring its finger 41 into contact with the mercury 39 when a magnet is brought into close proximity with said block, the spring mounting of the finger 41 serving to move said finger out of contact with the mercury when the influence of the magnet is diminished or removed.

A second magnetically-responsive switch member 43, functionally identical with the member 37, is secured exteriorly of the chamber 28 on the side of said chamber opposite to that supporting the member 37, and the switch member 43 is arranged to open and close a circuit in response to the variation in position of a permanent magnet 44 carried on the lower end of an arm 45 hingedly depending within the lesser compartment of the chamber 28 from a fixed pin 46. The arm 45 is so balanced and mounted as to normally hold its magnet 44 out of contact with the chamber wall and sufficiently remote from the switch member 43 as to maintain the latter in normally open-circuit relation, and said arm 45 is provided with a fixed lug 47 projecting toward the float 34 and so sized and shaped as to engage at times with a detent 48 carried by the upper adjacent margin of said float.

The detent 48 is in the form of a straight lever hingedly carried by the float 34 to overlie said float at one end and to project beyond the float toward the arm 45 at its other end, and said lever is so balanced as to normally assume the full-line position shown in Figure 4. The end of the detent 48 adjacent the arm 45 is beveled as shown and has such an extension from the float 34 as will function for engagement of the detent with the lug 47 of the arm 45 as said float moves through its range of vertical actuation. As the float 34 is caused to swing upwardly, the detent 48 engages beneath the lug 47 and swings about its own pivot to pass and clear said lug without oscillating the arm 45, but when said float moves downwardly from its elevated position the beveled end of said detent engages against the inclined upper margin of the lug 47 and slides along said lug margin to swing the arm 45 away from the float 34 and into engagement of the prongs of the magnet 44 with the chamber wall for actuation of the switch member 43 into circuit-closing relation of its elements. When the float 34 reaches its lowermost position, the detent 48 has cleared the lower margin of the lug 47 to permit the arm 45 to swing toward said float for retraction of the magnet 44 away from the member 43, with consequent return of the elements of said member 43 to open circuit position.

It is the function of the float chamber 28 and its associated operative elements to open and close control circuits of the dispensing apparatus in response to overflow from the bowl 12 through any one of the standards 17a, 17b, or 17c, such overflow, regardless of the standard through which it is initiated, entering the chamber 28 through the line 27 and escaping from said chamber to the line 29. When liquid is delivered to the chamber 28 through the line 27, said chamber rapidly fills with liquid to the height of the baffle 32 because of the restricted passage 33 through said baffle, and such accumulation of liquid within the chamber operates to elevate the float 34 without actuating the arm 45 and moves the magnet 36 away from the member 37 to break the circuit controlled by said member. As long as liquid is delivered to the chamber 28 through the line 27 at a rate greater than is accommodated through the baffle aperture 33, the float 34 will be maintained in its elevated position, but when delivery of liquid to said chamber through said line 27 is arrested, the liquid in said chamber drains through the aperture 33 to and through the return line 29, permitting the float 34 to return to its lowermost position and actuate the arm 45 for operation of the switch member 43 during such return.

The circuits serving the various elements of the apparatus are arranged for automatic control, determined by the deposit of a coin in suitable mechanism associated with the base 10. Obviously, a coin chute and associated circuit controls is provided for each of the coin sizes to be employed in operation of the apparatus, and hence the coin chutes will correspond in number with the number of adjustable overflow standards provided in the bowl 12. A typical coin chute with its associated circuit-control means is illustrated in operative association with the circuits of the apparatus in Figure 3.

As shown, a coin chute 49 is adapted to receive and guide a coin 50 into somewhat wedging engagement between spaced, downwardly-converging fingers 51 and 52, in which position the weight of the coin 50 tends to separate said fingers. The finger 51 serves as a retainer to hold the weight of the coin 50 against the finger 52, and said finger 51 is pivoted at its upper end on a pin 53 to swing through a vertical arc toward and away from an electromagnet 54 whereof the armature 55 is normally held by any suitable spring arrangement, not visible in the views here shown, in elevated position for engagement of its beveled free end with a roller 56 carried by the finger 51 in such manner as to normally urge said finger into obstructing relation with the coin passage. With this arrangement, energization of the electro-magnet 54 operates to draw the armature 55 downwardly toward the electro-magnet and beneath the roller 56, so that the arm 51 may swing toward the electro-magnet, thus opening the coin passage for escape of the coin 50 out of said passage and into a suitable coin box. When the electro-magnet 54 is deenergized, the armature 55 rises to the position shown in Figure 3 under the influence of its associated spring (not shown) and operates during its upward travel to swing the finger 51 away from the electro-magnet 54 and back into obstructing relation with the coin passage.

The finger 52 is the outer or free portion of a flat spring which is fixed at its other end to rigid portions of the assembly and is free to flex in response to the weight of a coin bearing against its outer portion. An arm 57 is associated with and depends from an intermediate portion of the finger 52 and supports a permanent magnet 58 on its lower free end, said magnet 58 being so disposed as to engage with its prongs against a rigid wall 59 of the apparatus when the finger 52 is flexed toward said wall under the weight of a coin bearing thereon, and to swing away from such wall engagement through the inherent tension of its supporting flat spring when weight of the coin is removed from the finger 52. The wall 59 supporting the finger 52 and arm 57 is preferably of non-magnetic material and serves as a mounting for a magnetically-responsive switch member 60, in all functional respects identical with the members 37 and 43, which is positioned in such operative relation with the magnet 58 as to close the circuit 65, controlled thereby, when the magnet 58 is moved into contact with the wall 59 under the weight influence of the coin 50, and to open said circuit 65 when the weight of the coin is removed from the finger 52 to permit the magnet 58 to swing away from its wall engagement.

A power circuit leading from any suitable source or supply of electrical energy is shown as comprising the conductors 62 and 63. A branch circuit 64 bridging between the conductors 62 and 63 leads through and connects in series the electro-magnet 54 and the switch member 43, so that, when the magnet 44 is moved during downward travel of the float 34 to close the circuit through said switch, the electro-magnet 54 is energized to swing the finger 51 away from the finger 52 for release of the coin 50 from its bearing engagement against said finger 52. The closing of the circuit through the member 43 is but momentary, since the magnet 44 moves away from said member as the float reaches its lowermost position, and opening of the circuit through said member results in deenergization of the electro-magnet 54 and consequent return of the finger 51 to its normal obstructing relation with the coin chute. Thus draining of liquid from the float chamber 28 and return of the float 34 to its lowermost position therein operates to release the coin 50 from its actuating position on the fingers 51 and 52 and promptly repositions said fingers to receive and respond to a subsequent coin inserted through the chute.

A branch circuit 65 bridging between the conductors 62 and 63 leads through and connects in series the switch member 60 and an electro-magnet 66 in such manner as to energize the latter when the circuit 65 is closed at the member 60 by positioning of the magnet 58 against the wall 59 under the weight influence of the coin 50, and to deenergize the electro-magnet 66 when release of the coin 50 permits the magnet 58 to move away from the wall 59. The electro-magnet 66 is provided with a swingable armature 67 normally held (by any suitable spring arrangement, not visible in the views here shown) in spaced, angular relation with the magnet body, and said armature supports and carries a switch member 68, preferably of mercury-tube type, so disposed as to open the circuit 69 served thereby when the armature 67 is at the limit of its spring-urged range of travel away from the magnet body, as when the latter is deenergized, and to close said circuit 69 when said magnet body is energized and consequently attracts the armature 67 to tilt the member 68. Thus closing of the switch member 60 through the weight influence of the coin 50 operates through the electro-magnet 66 to close the circuit 69 through the switch member 68; said circuit 69 remaining thus closed at the switch 68 so long as the switch 60 remains closed, and being opened at the switch 68 when the switch 60 opens upon release of the coin 50.

The circuit 69 bridges between the conductors 62 and 63 and leads through and connects in series the switch members 68, 37 and the motor 16 of the pump 15 in such manner as to energize said motor for actuation of the pump and delivery of liquid to the bowl 12 through the supply line 14 when the members 68 and 37 are in circuit-closing position. The switch member 68 is closed when a coin 50 is resting against the finger 52 and the switch 37 is closed when the float 34 is at its lowermost position in the drained chamber 28 with the magnet 36 engaging against the wall of said chamber, so when these two conditions exist the pump 15 is actuated and continues to operate to deliver liquid to the bowl 12. When overflow through any one of the standards 17a, 17b, or 17c enters the float chamber 28 and collects therein, the float 34 rises and withdraws the magnet 36 from its proximity to the switch member 37, permitting said switch to open and break the circuit to the motor 16. With no more liquid supplied to the bowl 12, overflow from said bowl soon ceases, the chamber 28 drains, and the float 34 descends, which action trips the arm 45 to momentarily close the switch member 43 and release the coin 50 from the finger 52, thus breaking the circuit 65 at the switch member 60 with consequent return of the switch 68 to open-circuit position so that the circuit 69 is not reestablished when the float 34 reaches its lowermost position and again closes the switch member 37, thereby repositioning the motor circuit 69 for complete closing upon the deposit of a subsequent coin 50.

The coin-responsive mechanism and associated circuits are shown and described in operative relation with the overflow standard 17c of greatest altitudinal extent within the bowl 12, which standard has an always open, direct connection with the chamber 28. Obviously, the lower standards 17a and 17b must be closed away from overflow communication with the chamber 28 if the capacity of the bowl measured by a higher overflow standard is to be attained, and normally-closed, electrically-controlled valves 31a and 31b are provided for such purpose. For each of the bowl capacities represented by the overflow standards 17a and 17b a separate, properly sized coin chute, identical with the chute 49, is provided, and each of said chutes has associated therewith coin-responsive mechanism and circuit control elements identical with those shown and hereinabove described. The finger 51 is of sufficient width to extend laterally beneath all of the coin chutes in position to receive and suitably react to the weight of a coin delivered through any one of said chutes. The switch members 60 of the additional coin chutes operate in response to the weight influence of a proper coin to close circuits corresponding to the circuit 65, such as are indicated at 70 and 71 as respectively serving the systems represented by the standards 17a and 17b. The circuits 70 and 71 lead through the electro-magnet 66 to establish and break the motor circuit 69 in exactly the manner and under the coin conditions above set forth, and said circuits differ from the circuit 65 only in that the circuit 70 includes the electrical control elements of the valve 31a in series with the electro-magnet 66, and the circuit 71 includes the electrical control elements of the valve 31b in series with the electro-magnet 66, so that when either of said circuits is closed through its switch member 60 to initiate liquid supply to the bowl 12, the valve controlling outflow through the corresponding overflow standard is automatically opened to limit the capacity of the bowl to that measured quantity represented by the value of the actuating coin. Since overflow from each of the standards passes through the chamber 28, such outflow serves to actuate the controls and elements associated with said chamber in the manner above set forth.

As should be apparent from the foregoing, the apparatus hereinabove described automatically operates in response to the deposit of a suitable coin to charge the bowl 12 with a measured quantity of liquid corresponding to the value of such coin, to release the coin from its actuating position, and to reposition the operative elements for repetitious actuation in response to further coin deposits. Delivery of the liquid from the bowl 12 to the purchaser is a subsequent, manually-controlled operation automatically limited to a condition wherein the bowl has been filled to the appropriate overflow level and supply of liquid to said bowl has been arrested. For delivery of liquid from the bowl 12, a discharge line 72 communicates with the bottom of said bowl through the cap 11 and leads through an electrically-controlled valve 73 and outwardly through the base 10 for gravity flow of liquid from said bowl. An elbow 74 is swiveled for actuation through a vertical arc to the outer end of the line 72 and in turn connects with a hose or flexible conduit 75 through which the liquid discharge may be directed to an automotive fuel tank or other container, hose 75 being, of course, provided at its discharge end with any suitable hand-operated nozzle.

Mounted to freely oscillate about the line 72 and rigidly secured to the adjacent end of the elbow 74, an annular flange 76 extends radially beyond said line and is defined by a cam-like, arcuate margin formed with an arcuate notch 77 at that point which is normally highest when the elbow 74 depends vertically. The notch 77 is adapted to receive a roller 78, or equivalent element, carried by or associated with the outer end of a lever 79 hingedly supported intermediate its ends in spaced, parallel relation with and above the laterally-extending portion of the line 72, and a spring 80 resiliently holds the element 78 within the notch 77 or against the margin of the flange 76. The lever 79 carries on its inner end a switch 81, preferably of mercury-tube type, tiltable between open and closed circuit positions, and said switch 81 is included in series with similar switch member 83 carried by the armature 67 and the electrical control elements of the valve 73 in a circuit 82 bridging between the conductors 62 and 63. The parts 76, 77, 78 and 79, illustrated as outside the casing 10 may, of course, be as well positioned within said casing, the elbow 74, only, projecting through the casing for connection, outside, with hose 75.

With the arrangement shown and described, the switch 81 is disposed to maintain the circuit 82 open when the element 78 is seated in the notch 77 and to close said circuit when the elbow 74 is rotated to oscillate the flange 76 and lift said element 78 out of the notch 77 and to a higher marginal point on said flange. The switch member 83 is fixed to the armature 67 in either superposed or laterally adjacent, parallel relation with the switch member 68 and is reversed in direction relative to the member 68 so that the member 83 functions to close its circuit 82 when the electro-magnet 66 is deenergized and the armature 67 is elevated away from the magnet body, and to open its circuit 82 when the magnet is energized and the armature drawn downwardly to close the circuit 69 through the switch member 68. The circuit 82 will thus always be closed at the switch member 83, in readiness for completion, through the switch member 81, to open the valve 73, when the circuit 69 serving the pump means is open at the switch member 68, and said circuit 82 is broken at the switch member 83 whenever the armature 67 is drawn downwardly against the electro-magnet 66 to complete the circuit 69 through the switch member 68. With this arrangement the valve 73 controlling delivery from the bowl 12 is held against the possibility of being opened during the time that the pump is operating to fill the bowl 12, and the circuit serving said valve is established for selective closing at the switch member 81 only when the circuit to the pump motor has been broken. Even with the member 83 in circuit-closing position, the valve 73 is not open until the elbow 74 is rotated out of normal position, thus providing selective, manually-controlled means for regulating discharge from the bowl 12.

The swivel connection between the elbow 74 carrying the hose 75 and the discharge line 72 has a function additional to actuation of the lever 79 for control of the circuit serving the valve 73, since such connection minimizes damage to the hose 75 resulting from kinking or abrupt bending of said hose, particularly adjacent the connection of the hose to the elbow 74, it being obvious that the elbow 74 will swing in its mounting to accommodate and relieve strains on the hose which might otherwise be productive of damage thereto.

An important feature of the invention is the substantial elimination of fire hazard in gasoline-vending apparatus. Through the use of a fluid tight float chamber fully-enclosed, mercury-tube type, switches and through the provision of coin-responsive actuating means wherein the coin does not itself become a part of an electrical circuit, sparking incident to the opening and closing of control circuits is obviated, and there is thus little if any probability that combustible vapors present in the apparatus might be ignited as a consequence of use or operation of the apparatus. While not specifically illustrated, it is to be understood that the pump motor, switch elements, circuits, and the like, may themselves be housed and enclosed as a further safe-guard against deterioration of and damage to said elements.

Since many changes, variations, and modifications in the specific form, construction, and arrangement of the elements shown and described may be had without departing from the spirit of my invention, I wish to be understood as being limited solely by the scope of the appended claims rather than by any details of the illustrative showing and foregoing descriptions.

I claim:

1. In liquid-dispensing apparatus of the character described having an elevated bowl, means automatically operable to supply liquid to said bowl, a discharge line for draining said bowl, and a delivery hose associated with said discharge line; means for minimizing kinking and abrupt bending of said hose and for selectively controlling outflow through said line, said means comprising a laterally-extending terminal portion in said discharge line, an elbow swivelled on the outer end of said lateral discharge line portion and connecting between said discharge line and hose, a normally-closed, electrically-controlled valve in said discharge line, a circuit serving said valve, a switch in said circuit tiltable between open and closed circuit positions, a lever hinged intermediate its ends for actuation in a vertical arc above and in alignment with the discharge line portion adjacent its associated elbow and supporting said switch on its inner end, an annular flange fixed to and projecting radially from the end of said elbow engaging said discharge line and disposed to engage beneath and lift the outer end of said lever to tilt the associated switch into circuit-closing relation, an arcuate notch in an upper portion of said flange adapted to receive the outer end of said lever when said elbow and associated hose depend in natural vertical position and thereby permit oscillation of said lever to tilt said switch to open circuit relation, and spring means engaging said lever to normally hold its outer end seated in said notch.

2. Inflammable-liquid-dispensing apparatus comprising an elevated bowl, pump means operable to supply liquid to said bowl, a plurality of overflow standards upstanding to different heights within said bowl for the determination of correspondingly varying liquid levels therein, an overflow return line common to and communicating with said overflow standards, normally-closed, electrically-operable valves between certain of said overflow standards and said line, coin-responsive means automatically operable to actuate said pump means and simultaneously open a flow passage to said return line through the overflow standard determinative of a liquid quantity proportioned to the value of the actuating coin, an imperforate chamber forming a part of said return line, means responsive to the flow conditions of liquid in said chamber to arrest supply of liquid to said bowl, wall of said chamber being of magnetically non-susceptible material and said responsive means comprising a float, a permanent magnet carried by said float and movable therewith into and out of proximity to said wall, and a magnetically responsive switch fixed exteriorly of said wall for reaction between open and closed circuit positions as determined by the proximity or remoteness of said permanent magnet.

3. Liquid-dispensing apparatus comprising an elevated bowl, a valve-controlled discharge line for draining said bowl, pump means operable to supply liquid to said bowl, a plurality of overflow standards upstanding to various heights within said bowl for the determination of correspondingly different liquid quantities, a normally-closed valve obstructing outflow through each of the standards of lesser height, a return line common to and communicating with said overflow standards, coin-responsive means automatically operable to condition said pump means for actuation and simultaneously open an outflow passage to said return line from the standard determinative of a liquid quantity proportioned to the value of the actuating coin, means associated with said return line responsive to the flow condition of liquid in said line to actuate the so-conditioned pump means, said latter means being operable by said flow, to arrest liquid supply to said bowl, to cause release of the actuating coin from its operating position and simultaneously close the valve controlling flow through the previously opened overflow passage, said coin-responsive means including downwardly-converging fingers positioned to receive a coin therebetween, a permanent magnet associated for movement with one of said fingers, and a magnetically-responsive switch positioned for reaction to the influence of said magnet when the latter moves into proximity with said switch under the weight influence of a coin.

4. Liquid-dispensing apparatus comprising an elevated bowl, a valve-controlled discharge line for draining said bowl, pump means operable to supply liquid to said bowl, a plurality of overflow standards upstanding to various heights within said bowl for the determination of correspondingly different liquid quantities, a normally-closed valve obstructing outflow through each of the standards of lesser height, a return line common to and communicating with said overflow standards, coin-responsive means automatically operable to condition said pump means for actuation and simultaneously open an outflow passage to said return line from the standard determinative of a liquid quantity proportioned to the value of the actuating coin, means associated with said return line responsive to the flow condition of liquid in said line to actuate the so-conditioned pump means, said latter means being operable by said flow to arrest liquid supply to said bowl, to cause release of the actuating coin from its operating position and simultaneously close the valve controlling flow through the previously opened overflow passage, said coin releasing means including a chamber in said return line, a float in said chamber, a permanent magnet moveably mounted in the chamber and adapted to normally remain remote from a wall of the chamber but to be moved into proximity to said wall by descent of the float, said wall being of magnetically non-susceptible material, and a magnetically responsive switch exteriorly of said wall adapted for reaction to the influence of said magnet when the magnet is moved into proximity to said wall.

5. In combination with apparatus for dispensing measured quantities of inflammable liquid having an elevated bowl, a pump for pumping liquid into the bowl, an electric circuit serving said pump and an overflow return line from said bowl, means in said return line and responsive to the flow of liquid therein for interrupting said circuit, said means comprising a chamber formed of magnetically non-susceptible material and provided with liquid inflow and outflow means but otherwise closed against passage of fluid in any direction, a float mounted in said chamber and adapted to rise and fall responsive to the rise and fall of liquid in the chamber, a permanent magnet movably mounted in said chamber and adapted to contact a wall of said chamber or be retracted from such wall responsive to the falling or rising of said float and a magnetically responsive switch in said circuit outside said chamber wall and positioned for reaction to the influence of said permanent magnet when said magnet is in contact with said wall.

6. In apparatus as defined in claim 5, said chamber being provided with an upstanding, transverse baffle dividing said chamber into a greater compartment communicating with the inflow line serving the chamber and a lesser compartment communicating with the outflow line from said chamber, and apertures communicating through the base of said baffle between said compartments, said apertures being proportioned in effective area to restrict flow therethrough to a quantity less than the capacity of the inflow line, whereby a quantity of liquid is retained in said chamber until inflow thereto has ceased.

VERN W. WEST.

REFERENCES CITED

The following references are of record in the file of this patent:

UNITED STATES PATENTS

| Number | Name | Date |
|---|---|---|
| 1,829,534 | Overpeck | Oct. 27, 1931 |
| 2,204,161 | Shepherd | June 11, 1940 |
| 1,894,275 | Krause | Jan. 17, 1933 |
| 1,705,755 | Felver | Mar. 19, 1929 |
| 1,673,305 | Yont et al. | June 12, 1928 |
| 1,303,215 | Anthony | May 6, 1919 |
| 1,352,645 | Anthony | Sept. 14, 1920 |
| 2,240,458 | Grise | Apr. 29, 1941 |
| Re. 18,632 | Stidwell | Oct. 18, 1932 |
| 1,925,633 | Gluck | Sept. 5, 1933 |
| 1,927,447 | Rybeck | Sept. 19, 1933 |
| 2,329,370 | Hicks | Sept. 14, 1943 |